United States Patent
Puzicha (10) Patent No.: US 9,785,634 B2
(45) Date of Patent: Oct. 10, 2017

(54) INTEGRATION AND COMBINATION OF RANDOM SAMPLING AND DOCUMENT BATCHING

(75) Inventor: Jan Puzicha, Bonn (DE)

(73) Assignee: Recommind, Inc., San Francisco, CA (US)

( * ) Notice: Subject to any disclaimer, the term of this patent is extended or adjusted under 35 U.S.C. 154(b) by 0 days.

(21) Appl. No.: 13/153,419

(22) Filed: Jun. 4, 2011

(65) Prior Publication Data

US 2012/0310935 A1 Dec. 6, 2012

(51) Int. Cl.
*G06F 17/30* (2006.01)
*G06Q 10/10* (2012.01)
*G06Q 50/18* (2012.01)

(52) U.S. Cl.
CPC ..... *G06F 17/30011* (2013.01); *G06Q 10/103* (2013.01); *G06Q 50/18* (2013.01)

(58) Field of Classification Search
CPC ........... G06F 17/3071; G06F 17/30011; G06F 17/30705; G06F 17/279; G06F 17/30522; G06N 99/005; G06N 5/043; G06Q 30/02; G06Q 10/10; G06Q 10/103; G06Q 50/18
USPC ..................... 707/737, 804; 702/181; 706/62
See application file for complete search history.

(56) References Cited

U.S. PATENT DOCUMENTS

| 4,839,853 A | 6/1989 | Deerwester et al. |
| 6,687,696 B2 | 2/2004 | Hofmann et al. |
| 7,051,017 B2 | 5/2006 | Marchisio |
| 7,328,216 B2 | 2/2008 | Hofmann et al. |
| 7,376,635 B1 | 5/2008 | Porcari et al. |
| 7,428,541 B2 | 9/2008 | Houle |
| 7,454,407 B2 | 11/2008 | Chaudhuri et al. |
| 7,519,589 B2 | 4/2009 | Charnock et al. |
| 7,558,778 B2 | 7/2009 | Carus et al. |
| 7,657,522 B1 | 2/2010 | Puzicha et al. |

(Continued)

FOREIGN PATENT DOCUMENTS

| EP | 2718803 | 4/2014 |
| WO | WO2012170048 | 12/2012 |

OTHER PUBLICATIONS

Joachims, Thorsten, "Transductive Inference for Text Classification Using Support Vector Machines", Proceedings of the Sixteenth International Conference on Machine Learning, 1999, 10 pages.

(Continued)

*Primary Examiner* — Shew-Fen Lin
(74) *Attorney, Agent, or Firm* — Carr & Ferrell LLP (57) ABSTRACT

Methods and systems of integrated batching and random sampling of documents for enhanced functionality and quality control, such as validation, within a document review process are provided herein. According to various embodiments, a batching request may be received and may include a population size that corresponds to a total amount of documents available for sampling. The batching request may also include an acceptable margin of error. A random sample size may be calculated based on the batching request, and then a subset of documents corresponding to the random sample size may be selected from the total amount of documents available for sampling. The subset of documents may be grouped into one or more batches, and the one or more batches may be assigned to one or more review nodes.

14 Claims, 4 Drawing Sheets

(56) References Cited

U.S. PATENT DOCUMENTS

| | | |
|---|---|---|
| 7,933,859 B1 | 4/2011 | Puzicha et al. |
| 7,945,600 B1 * | 5/2011 | Thomas et al. ............... 707/804 |
| 8,196,030 B1 | 6/2012 | Wang et al. |
| 8,489,538 B1 | 7/2013 | Puzicha et al. |
| 8,554,716 B1 | 10/2013 | Puzicha et al. |
| 8,577,866 B1 | 11/2013 | Osinga et al. |
| 9,595,005 B1 | 3/2017 | Puzicha et al. |
| 2001/0037324 A1 | 11/2001 | Agrawal et al. |
| 2002/0080170 A1 | 6/2002 | Goldberg et al. |
| 2003/0120653 A1 | 6/2003 | Brady et al. |
| 2004/0210834 A1 | 10/2004 | Duncan et al. |
| 2005/0021397 A1 | 1/2005 | Cui et al. |
| 2005/0027664 A1 | 2/2005 | Johnson et al. |
| 2005/0262039 A1 | 11/2005 | Kreulen et al. |
| 2006/0242190 A1 | 10/2006 | Wnek |
| 2006/0294101 A1 | 12/2006 | Wnek |
| 2007/0226211 A1 | 9/2007 | Heinze et al. |
| 2008/0086433 A1 | 4/2008 | Schmidtler et al. |
| 2009/0043797 A1 | 2/2009 | Dorie et al. |
| 2009/0083200 A1 | 3/2009 | Pollara et al. |
| 2009/0106239 A1 | 4/2009 | Getner et al. |
| 2009/0119343 A1 | 5/2009 | Jiao et al. |
| 2009/0164416 A1 | 6/2009 | Guha |
| 2009/0306933 A1 | 12/2009 | Chan et al. |
| 2010/0014762 A1 | 1/2010 | Renders et al. |
| 2010/0030798 A1 | 2/2010 | Kumar et al. |
| 2010/0250474 A1 | 9/2010 | Richards et al. |
| 2010/0312725 A1 | 12/2010 | Privault et al. |
| 2010/0325102 A1 | 12/2010 | Maze |
| 2011/0029536 A1 | 2/2011 | Knight et al. |
| 2011/0047156 A1 | 2/2011 | Knight et al. |
| 2011/0135209 A1 | 6/2011 | Oba |
| 2017/0132530 A1 | 5/2017 | Puzicha et al. |

OTHER PUBLICATIONS

Webber et al. "Assessor Error in Stratified Evaluation," Proceedings of the 19th ACM International Conference on Information and Knowledge Management, 2010. pp. 539-548. [Accessed Jun. 2, 2011—ACM Digital Library] http://portal.acm.org/citation.cfm?doid=1871437.1871508.

Webber et al. "Score Adjustment for Correction of Pooling Bias," Proceedings of the 32nd international ACM SIGIR conference on Research and development in information retrieval, 2009. pp. 444-451. [Accessed Jun. 2, 2011—ACM Digital Library] http://portal.acm.org/citation.cfm?doid=1571941.1572018.

Buckley et al. "Bias and the Limits of Pooling for Large Collections," Journal of Information Retrieval, Dec. 2007. vol. 10, No. 6 [Accessed Jun. 2, 2011—Google, via ACM Digital Library] http://www.cs.umbc.edu/~ian/pubs/irj-titlestat-final.pdf.

Carpenter, "E-Discovery: Predictive Tagging to Reduce Cost and Error," The Metropolitan Corporate Counsel, 2009, p. 40.

Zad et al. "Collaborative Movie Annotation," Handbook of Multimedia for Digital Entertainment and Arts, 2009, pp. 265-288.

Final Office Action, dated Sep. 26, 2014, U.S. Appl. No. 13/745,617, filed Jan. 18, 2013.

Final Office Action, dated Nov. 22, 2013, U.S. Appl. No. 13/745,617, filed Jan. 18, 2013.

Advisory Action, dated Feb. 3, 2014, U.S. Appl. No. 13/745,617, filed Jan. 18, 2013.

Non-Final Office Action, dated Apr. 21, 2014, U.S. Appl. No. 13/745,617, filed Jan. 18, 2013.

Extended European Search Report dated Feb. 24, 2015 in European application No. 11867283.1, filed Jul. 25, 2011.

Notice of Allowance dated Oct. 17, 2016, U.S. Appl. No. 13/848,023, filed Mar. 20, 2013.

* cited by examiner

INTEGRATION AND COMBINATION OF RANDOM SAMPLING AND DOCUMENT BATCHING

FIELD OF THE INVENTION

The present invention relates generally to methods and systems for document review, and more specifically to methods and systems of batching and random sampling of documents for enhanced functionality and quality control, such as validation, within a document review process.

SUMMARY OF THE INVENTION

Various embodiments of the present invention may be comprised of systems and methods for integrated batching and random sampling of documents for enhanced functionality and quality control, such as validation, within a document review process. A batching request may be received from a user, and may include a population size that corresponds to a total amount of documents available for sampling. The batching request may also include an acceptable margin of error. A random sample size may be calculated based on the batching request, and then a subset of documents corresponding to the random sample size may be selected from the total amount of documents available for sampling. The subset of documents may be grouped into one or more batches, and the one or more batches may then be assigned to one or more review nodes.

According to additional exemplary embodiments, the present invention may be directed to a system of integrated batching and random sampling of documents for enhanced functionality and quality control, such as validation, within a document review process. These systems may include (a) a memory for storing executable instructions; (b) a processor for executing the instructions stored in memory, the executable instructions comprising: (1) a query module that receives a batching request, the batching request comprising: (i) a population size corresponding to a total amount of documents available for sampling, and (ii) an acceptable margin of error; (2) an analysis module that is communicatively coupled to the query module that (i) computes a random sample size from the batching request, and (ii) randomly selects a subset of documents from the total amount of documents available for sampling; (3) a batching module communicatively coupled to the analysis module that may (i) group the subset of documents into one or more batches, and (ii) assign the batches to one or more review nodes; (4) a communications module communicatively coupled to the batching module and one or more review nodes that transmits batches to the review nodes; and (5) a statistical evaluation module that applies a statistical hypothesis test to the subset of documents to calculate a first statistical response to a statistical query and may be communicatively coupled to the query module and the analysis module.

DETAILED DESCRIPTION

Various embodiments of the present invention include systems and methods for integrated batching and random sampling of documents for enhanced functionality and quality control, such as validation, within a document review process. A batching request may be received and may include a population size that corresponds to a total amount of documents available for sampling. The batching request may also include an acceptable margin of error. A random sample size may be calculated based on the batching request, and a subset of documents corresponding to the random sample size may be selected from the total amount of documents available for sampling. The subset of documents may be grouped into one or more batches, and the one or more batches may be assigned to one or more review nodes.

The systems and methods of the present invention may be applied to document review activities, such as information or document reviews performed in a legal context. Document reviews may occur, for example, prior to the onset of litigation (pre-litigation review) or during the discovery phase of litigation. Document reviews for pre-litigation review analysis may be conducted to assess the general position of a party who may be the subject of future litigation or investigation. A subset of documents may be selected from a larger universe of documents based on specified criteria, such as author, recipient, subject, key words, and the like. The actual review of the selected documents may be conducted by human reviewers reading some or all of each document or conducted using machine-assisted iterative review.

More generally, the systems and methods of the present invention may be applied to any situation that requires review and analysis of information. A company may have a need to review internal documents related to a particular subject or event, such as invoicing related to a particular product. The company may use the present invention to sample a document database to find invoices that include the product and that were purchased by a specified customer or group of customers. The present invention may also be used for research purposes. A researcher may use various embodiments of the present invention to search a large database such as Google Books™ to find documents related to a specified search criteria.

Based on the results of the review and goals of the review process, the documents may be classified according to predetermined objective or subjective criteria. In a simple review process, documents may simply be classified as responsive or non-responsive to the criteria.

The document review process typically includes identifying a batch of documents within a system, then exporting the batch outside the system. The batch may then be randomly sampled using an external tool and process that occurs outside the review system to identify the documents to be reviewed. The randomly selected documents may then be returned to the system. The possibility of error may increase each time documents are output and returned to the system, and robust quality control procedures may be difficult to implement within the document review process.

Figure 1:
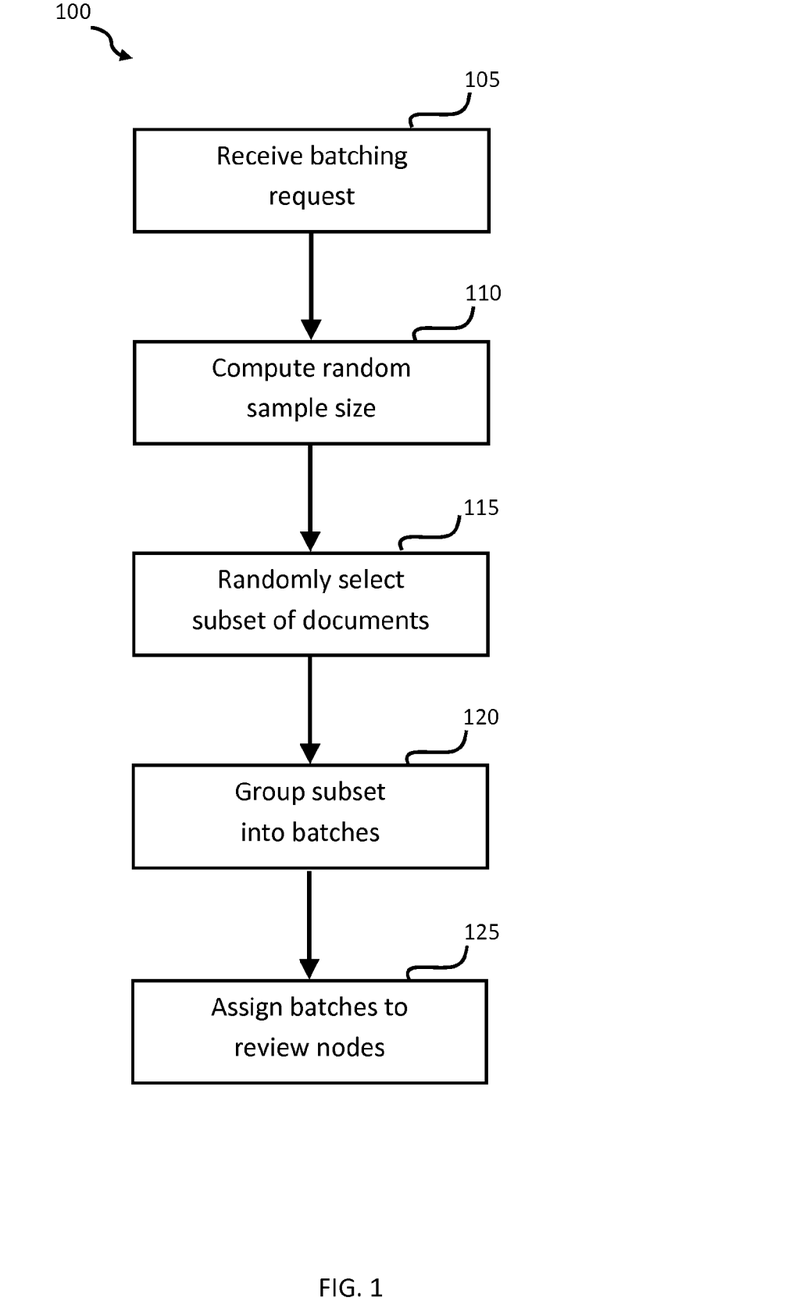
FIG. 1 is an exemplary flow diagram of a method of integrated batching and random sampling of documents for enhanced functionality and quality control, such as validation, within a document review process according to various embodiments.

FIG. 1 is a flow chart of various embodiments of a method 100 for enhanced functionality within the document review process. The enhanced functionality may include, for example, quality control of the process, consistency of random sampling, enhanced information available for decision making, validation of results or assumptions, and defensibility. Method 100 may improve the quality of the review process by reducing error rates associated with batching documents and random sampling by performing the integrated batching and random sampling within a single application. At step 105, a batching request is received. The batching request may specify a population size corresponding to a total amount of documents available for sampling. The population size may represent the total universe of documents available for the particular review. In other embodiments, the population size may represent one or more subsets of the total universe of documents. For example, if the total universe of documents is all emails sent or received by a company, the subset of documents may represent a recipient's address, date range, key words, or any combination of such criteria.

A margin of error may also be specified in the batching request. The margin of error (also known as the confidence interval) is the maximum allowed difference between the true population parameter and a sample estimate of that parameter. In the email example above, suppose that the desired outcome of the review process was to find all emails sent by an individual that mention a specified topic. The margin of error would be the plus or minus percentage that the sample population would be expected to deviate from the actual population. If the document review of the sample concluded that 37 percent of the emails met the specified criteria and the margin of error was 2 percent, then this indicates that if the review process was conducted on the entire population, the percentage of emails that met the criteria would fall within the range of 35-39 percent (i.e., 37 percent±2 percent).

A statistical analysis may then be performed to compute a random sample size (step 110). The sample size relates to the number of documents selected as part of a randomization process. The larger the sample size, the higher the probability that the results of the review process truly reflect the universe of documents. Although a large sample size may increase the probability of a "correct" outcome, other considerations such as time and cost may dictate a smaller sample size. The input of factors that may be required to perform the statistical analysis to compute the random sample size are further addressed in the discussion of FIG. 2 below.

Returning to FIG. 1, once the random sample size has been calculated, a subset of documents corresponding to the random sample size may be selected from the total amount of documents (step 115). The selection process itself may be a random process. In various embodiments, a random number generator may be used in the process to determine which documents will be included in the random sample. For example, if the amount of documents available for sampling is 100,000 then the documents would be numbered from 1 to 100,000. A random number algorithm may be used to generate numbers between minimum and maximum values (in this example, the minimum value would be 1 and the maximum value would be 100,000). The numbered documents corresponding to the generated random numbers would be selected. This procedure may proceed iteratively until a number of chosen documents equals the sample size. Any other procedure for randomly selecting documents from the total amount of documents may be also used.

The selected documents may then be grouped into one or more batches (step 120). The batches may be based on any criteria specified by a user, such as type of document, names mentioned in the documents, key words, and the like. The batches may then be assigned to one or more review nodes (step 125). The assignment of the batches may itself be random, or may be based on certain attributes of the reviewer at a particular review node, such as expertise in a certain area or level of experience.

Figure 2:
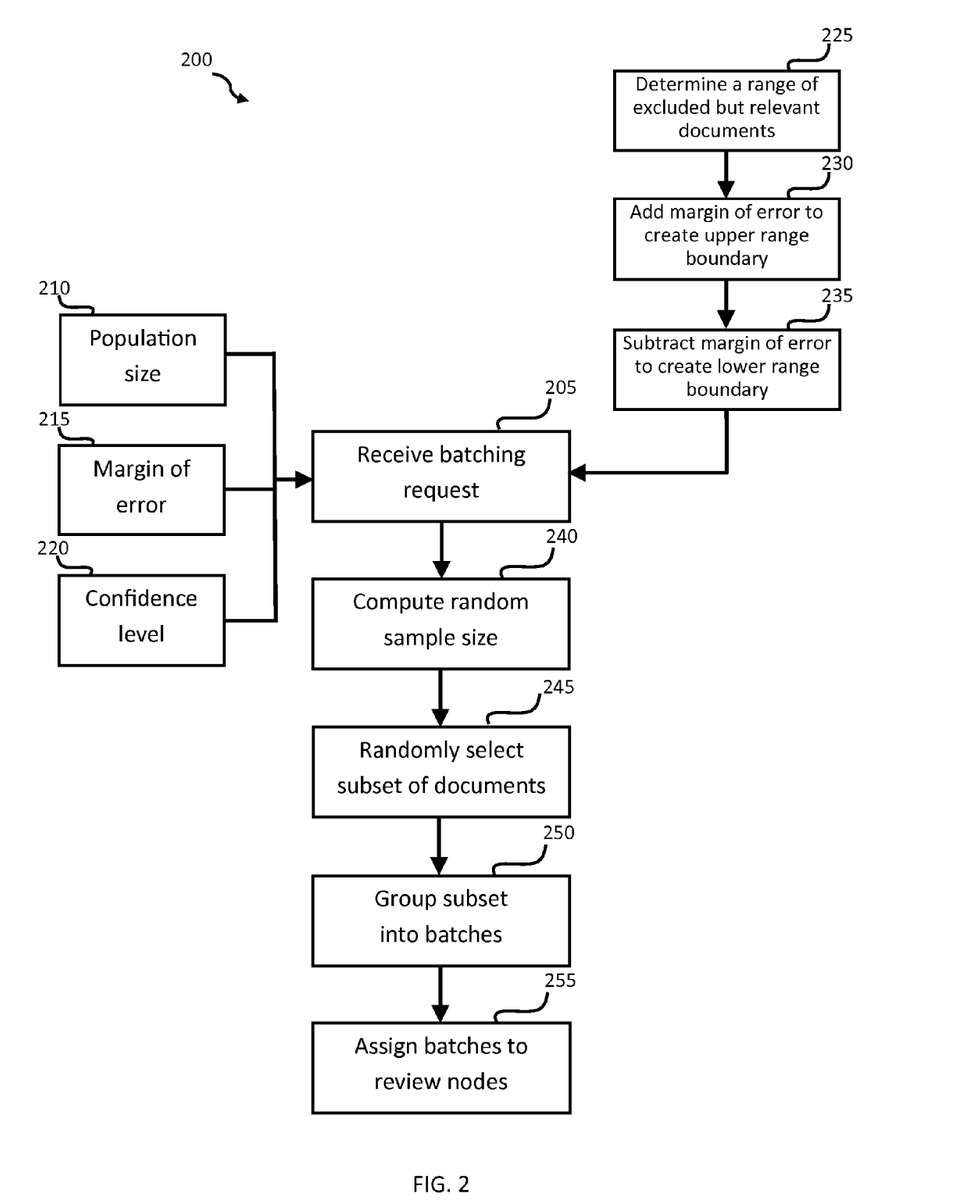
FIG. 2 is an exemplary flow diagram of a method of integrated batching and random sampling of documents for enhanced functionality and quality control, such as functionality, within a document review process according to various embodiments.

FIG. 2 is a flow chart of various embodiments that may allow a user greater flexibility in how the method of FIG. 1 may be used. An application may request that the user enter a desired population size (step 210) and margin of error (step 215) as described above, as well as a confidence level (step 220). The confidence level refers to the likelihood that the true population parameter lies within the range specified by the margin of error. For example, a 95 percent confidence level means that there is a 95 percent certainty that the true population parameter falls within the margin of error.

Once the population size, margin of error, and confidence level are inputted, method 200 proceeds through steps 240-255 as described above for corresponding steps in FIG. 1. Thus, method 200 may be used for predictive analytics (or predictive decision making) at the start of the review process. In the example presented above, the amount of documents available for sampling is 100,000. The present invention may be used to gauge the cost of various levels of review of those 100,000 documents. A plurality of values may be inputted for the margin of error and the confidence level (the population size in this example is fixed at 100,000). The method will compute the random sample size, group subsets of the random sample into batches and assign the batches to reviewers. Suppose that for a given set of input values, the sample size is 1,500 and there are three reviewers (Reviewers A, B, and C). The method may, for example, assign 300 documents to Reviewer A, 700 documents to Reviewer B, and 500 documents to Reviewer C. Using the cost of each reviewer (such as on a per hour or per document basis), the cost of the review can be computed. This cost may then be compared to the margin of error and confidence level to ascertain whether the defensibility of the review process is worth the cost. If a higher margin of error and lower confidence level can be tolerated, then these values may be adjusted until the sample size is reduced to where an acceptable balance of cost and risk is achieved.

The present invention may further be used as a predictive analytics tool. For example, a general counsel may be faced with potential litigation. A first step in the pre-litigation review may be to make a general assessment of the situation. The present invention may be used to determine an amount of information that is relevant, responsive, and related to issues that may be important to the case. If a relatively low number of documents are found to be responsive, then the overall risk may be characterized as low. On the other hand a high risk may be indicated if a relatively large number of documents are responsive. The general counsel may analyze the review process in greater detail to determine the error rate (e.g., number or percentage of relevant or responsive documents missed in the review process) and further refine the level of risk based on the error rate. Using the methods and systems of the present invention, the general counsel may be able to gain critical information which may enhance the decision-making process.

In various embodiments, the present invention may be used as a validation tool. For example, a company may have collected and processed documents and posted the documents for review. After the review process has been completed, the integrated batching and random sampling of the present invention may be used to validate the review results. Suppose that the review has concluded that 90 percent of the documents are responsive. The present invention may be used to analyze a subset of the review documents to estimate the accuracy of the review. Given the margin of error and confidence level of the validation review, more informed decisions may be made based on the review results.

Method 200 may be further enhanced by expanding the population size in a statistical manner in order to increase the accuracy of the review process. In the example above, suppose that the 100,000 emails were selected from a larger population of 500,000 emails, which leaves 400,000 excluded documents. Some percentage of those documents may represent relevant documents. Thus, a statistical query regarding the population of excluded documents may be formulated. A statistical hypothesis test based on the statistical query may be applied to the subset of excluded documents to calculate a first statistical response to the query. The first statistical response may then be utilized to calculate a second statistical response to the query.

As illustrated in FIG. 2, a range of excluded but relevant documents may be determined (step 225), such as applying a predictive analysis to predict a population of relevant documents in the subset of excluded documents. A margin of error may be added to the population of excluded but relevant documents to create an upper range boundary (step 230), and subtracted from the population of excluded but relevant documents to create a lower range boundary (step 235). The range of excluded but relevant documents may extend between the lower range boundary and the upper range boundary, inclusive. The range of excluded but relevant documents may become part of the batching request (step 205).

In various embodiments, the range of excluded but relevant documents may be used to compare different review methods. Embodiments of method 200 may be used, for example, to determine a range of excluded but relevant documents for a subset of machine reviewed documents and a subset of human reviewed documents. The two ranges may then be compared together to determine a difference between machine reviewed documents and human reviewed documents. The difference may be expressed as a percentage or another value known in the art. The machine review method may be utilized when the difference is less than a threshold amount. Thus, the present invention may be used as a quality control tool to assess the performance of different review methods as compared to a standard.

Figure 3:
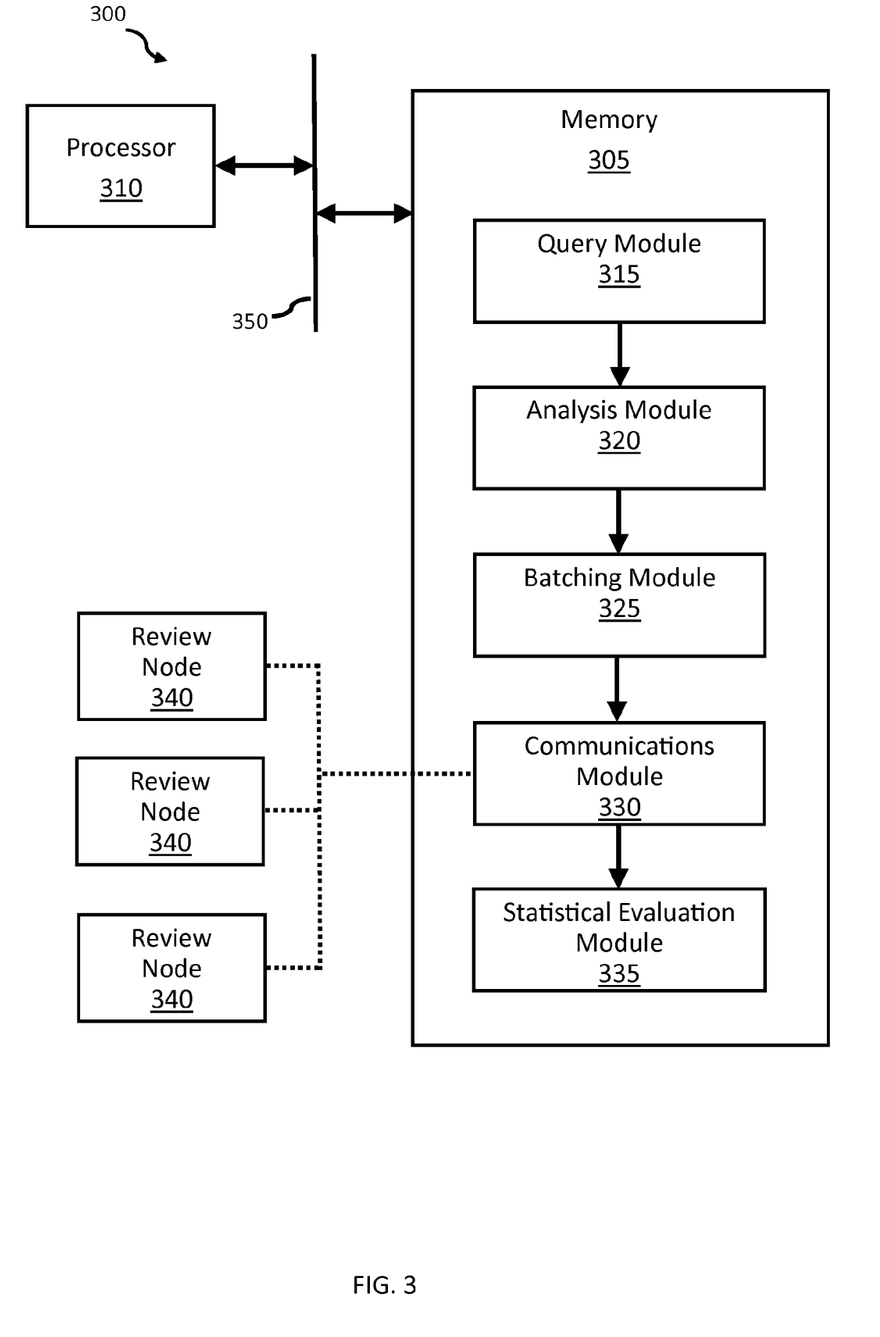
FIG. 3 is a schematic diagram of an exemplary architecture of a system of integrated batching and random sampling of documents for enhanced functionality and quality control, such as validation, within a document review process according to various embodiments.

FIG. 3 illustrates a system 300 of integrated batching and random sampling of documents for enhanced functionality and quality control, such as validation, within a document review process. System 300 is comprised of a memory 305 for storing executable instructions and a processor 310 for executing the instructions stored in memory 305. The processor 310 and memory 305 may be connected by a single bus 350, or by any other connection device known in the art.

The executable instructions may be comprised of a plurality of modules. In various embodiments, the modules may include a query module 315 that receives a batching request. The batching request may include a population size corresponding to a total amount of documents available for sampling and an acceptable margin of error. An analysis module 320 may also be present within the executable instructions that is communicatively coupled to the query module 315. The analysis module 320 may compute a random sample size from the batching request and randomly selects a subset of documents from the total amount of documents available for sampling. In various embodiments, the subset of documents may correspond to the random sample size. Further, the executable instructions may include a batching module 325 that may be communicatively coupled to the analysis module 320. The batching module 325 may group the subset of documents into one or more batches, and then assign the batches to one or more review nodes.

In addition, the executable instructions may further comprise a communications module 330 communicatively coupled to the batching module 325 and one or more review nodes 340. The communications module may transmit batches to the review nodes 340. For example, the batches may be based on discrete topics, and the communications module 330 transmits each batch to the reviewer who specializes in that topic.

The executable instructions may be further comprised of a statistical evaluation module 335 that applies a statistical hypothesis test to the subset of documents to calculate a first statistical response to a statistical query. The statistical evaluation module 335 may then utilize the first statistical response to calculate a second statistical response to the statistical query for the total amount of documents available for sampling. The statistical evaluation module 335 may be communicatively coupled to the query module 315 and the analysis module 320.

According to some embodiments, the system 300 may include a cloud-based computing environment that collects, processes, analyzes, and publishes datasets. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™, or such systems may be accessible to outside users who deploy applications within the computing infrastructure to obtain the benefit of large computational or storage resources.

The cloud may be formed, for example, by a network of web servers with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend upon the type of business associated with the user.

Figure 4:
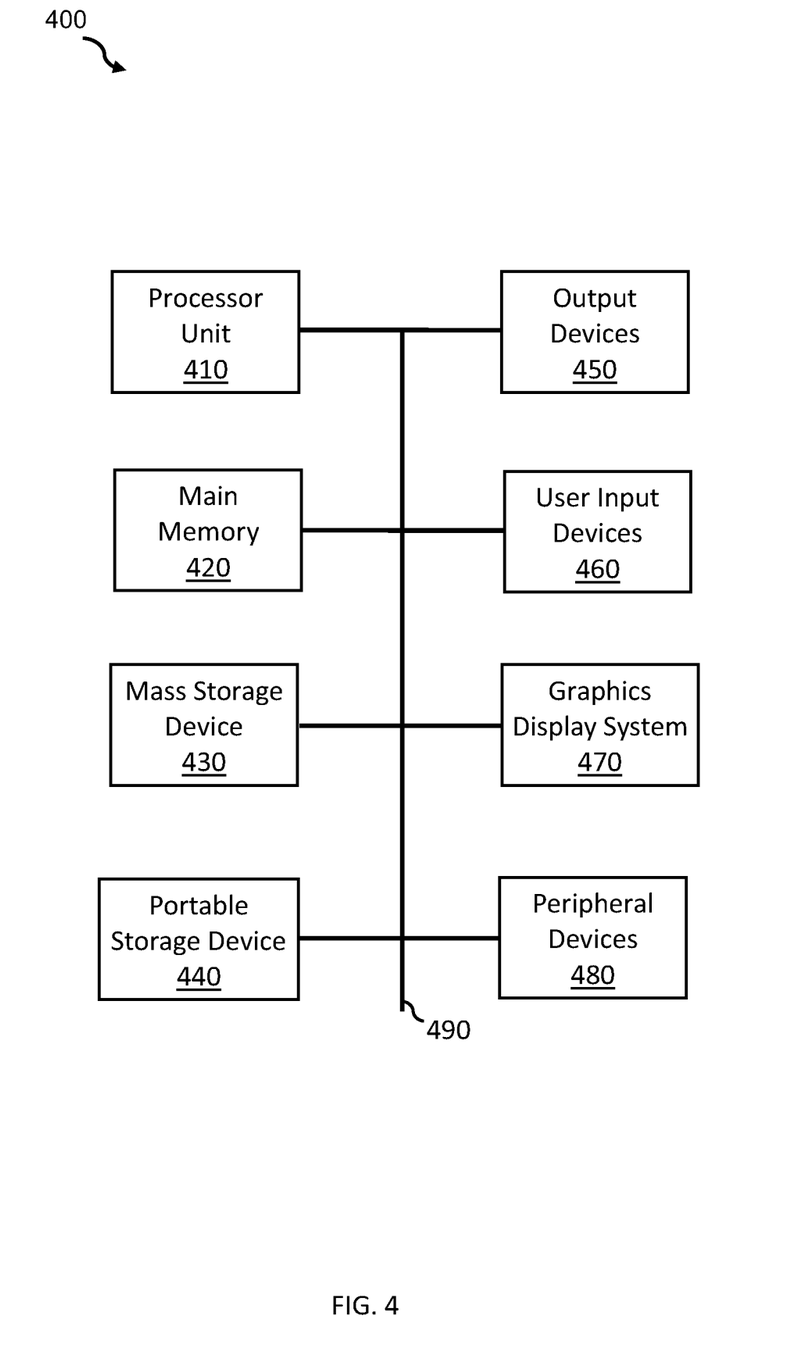
FIG. 4 is a block diagram of an exemplary computing system that may be utilized to practice aspects of the present disclosure.

FIG. 4 illustrates an exemplary computing system 400 that may be used to implement an embodiment of the present technology. The computing system 400 of FIG. 4 includes one or more processor units 410 and main memory 420. Main memory 420 stores, in part, instructions and data for execution by processor unit 410. Main memory 420 can store the executable code when the system 400 is in operation. The system 400 of FIG. 4 may further include a mass storage device 430, portable storage device(s) 440, output devices 450, user input devices 460, a graphics display system 470, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device(s) 440, and graphics display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into main memory 420.

Portable storage device 440 operates in conjunction with a portable non-volatile storage media, such as a floppy disk, compact disk or digital video disc, to input and output data and code to and from the computer system 400 of FIG. 4. The system software for implementing embodiments of the present technology may be stored on such a portable media and input to the computer system 400 via the portable storage device 440.

User input devices 460 provide a portion of a user interface. User input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Graphics display system 470 may include a liquid crystal display (LCD) or other suitable display device. Graphics display system 470 receives textual and graphical information, and processes the information for output to the display device.

Peripheral devices 480 may include any type of computer support device to add additional functionality to the computer system. Peripheral device(s) 480 may include a modem or a router.

The components contained in the computer system 400 of FIG. 4 are those typically found in computer systems that may be suitable for use with embodiments of the present technology and are intended to represent a broad category of such computer components that are well known in the art. Thus, the computer system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable media). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage media" and "computer-readable storage media" as used herein refer to any media or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method of integrated batching and random sampling of documents for enhanced functionality within document review processes, comprising:
    receiving a batching request, the batching request including:
        a population size that corresponds to a number of a total amount of documents available for sampling; and
        an acceptable margin of error;
    computing a random sample size from the batching request;
    randomly selecting a subset of documents from the total amount of documents available for sampling, a number of the randomly selected subset of documents corresponding to the random sample size, a set of excluded documents being documents in the total amount of documents available for sampling that are not included in the randomly selected subset of documents;
    determining a range of relevant documents within the set of excluded documents by determining a population of relevant documents within the set of excluded documents, the determination performed by:
        receiving a query regarding the total amount of documents,
        applying a hypothesis test to the randomly selected subset of documents to calculate a first response to the query for the randomly selected subset of documents, and utilizing the first response to calculate a second response to the query for the population of excluded but relevant documents within the total amount of documents;

randomly grouping the randomly selected subset of documents into a plurality of batches for assignment to a plurality of review nodes, at least one review node being a machine review node and at least one node being a human review node;

assigning each of the randomly grouped batches to a review node of the plurality of review nodes for review of the respective batch;

determining a range of excluded but relevant documents for both a batch of machine reviewed documents and a batch of human reviewed documents;

comparing the ranges together to determine a difference between machine reviewed documents and human reviewed documents; and utilizing machine document review if the difference is less than a threshold amount.

2. The method according to claim 1, wherein the batching request further includes a selected confidence level.

3. The method according to claim 1, further comprising: applying a statistical hypothesis test, the statistical hypothesis test including:
adding the margin of error to the population of excluded but relevant documents to create an upper range boundary and subtracting the margin of error to the population of excluded but relevant documents to create a lower range boundary; and
wherein the range of excluded but relevant documents within the total amount of documents extends between the lower range boundary and the upper range boundary, inclusive.

4. The method according to claim 1, wherein:
the random grouping of the randomly selected subset of documents into the plurality batches is based on at least one of type of document, names mentioned in the documents, and key words; and
the assigning of each of the randomly grouped batches to a review node of the plurality of review nodes is based on at least one of an expertise of a reviewer in a certain area and a level of experience of the reviewer.

5. The method according to claim 1, further comprising predicting a cost of the document review process as a function of at least one of a margin of error and a confidence level.

6. The method according to claim 1, further comprising: determining a percentage of documents missed in the document review process;
and determining a level of risk based on the percentage.

7. The method according to claim 1, further comprising predicting a number of relevant documents in a further subset of documents representing the total amount of documents excluding the randomly selected subset of documents.

8. A system of integrated batching and random sampling of documents for enhanced functionality within document review processes, the system comprising:
a memory for storing executable instructions for batching and random sampling of documents for quality control within document review processes; and
a processor for executing the instructions stored in memory, the executable instructions comprising:
a query module that receives a batching request, the batching request including a population size that corresponds to a total amount of documents available for sampling and an acceptable margin of error;
an analysis module communicatively coupled to the query module that computes a random sample size from the batching request and randomly selects a subset of documents from the total amount of documents available for sampling, the subset of documents corresponding to the random sample size, wherein the analysis module determines a range of excluded but relevant documents within the total amount of documents by determining a population of excluded but relevant documents within the subset of documents, the determination performed by:
receiving a query regarding the total amount of documents,
applying a hypothesis test to the subset of documents to calculate a first response to the query for the subset of documents, and
utilizing the first response to calculate a second response to the query for the population of excluded but relevant documents within the subset of documents;
a batching module communicatively coupled to the analysis module that groups the subset of documents into a plurality of batches, and assigns one or more of the batches to a human review node and one or more batches to a machine review node; and
a communications module coupled to the batching module and review nodes that:
determines a range of excluded but relevant documents for both a subset of machine reviewed documents and a subset of human reviewed documents,
compares the ranges together to determine a difference between machine reviewed documents and human reviewed documents, the difference being expressed as a percentage, and
transmits the batches to machine document review nodes if the difference is less than a threshold amount.

9. The system according to claim 8, further comprising a communications module communicatively coupled to the batching module and communicatively coupleable to one or more review nodes, the communications module transmits the one or more batches to the one or more review nodes.

10. The system according to claim 8, further comprising a statistical evaluation module that applies a statistical hypothesis test to the randomly selected subset of documents to calculate a first statistical response to the statistical query for the randomly selected subset of documents; and utilizes the first statistical response to calculate a second statistical response to the statistical query for the total amount of documents available for sampling, the statistical evaluation module being communicatively coupled to the query module and the analysis module.

11. A method for reviewing documents, comprising:
computing a random sample size from a batching request including a number of documents and a margin of error;
randomly selecting a subset of documents from the total amount of documents, the randomly selected subset corresponding to the random sample size;
determining a range of excluded but relevant documents within the total amount of documents by:
receiving a query regarding the total amount of documents,
applying a hypothesis test to the randomly selected subset of documents to calculate a first response to the query for the randomly selected subset of documents, and utilizing the first response to calculate a second response to the query for the population of excluded but relevant documents within the subset of documents;

randomly grouping the randomly selected subset of documents into a plurality of batches based on at least one of type of document, names mentioned in the documents, and key words;

assigning each of the randomly grouped batches to a plurality of review nodes based on at least one of an expertise of a reviewer of a respective node in a certain area and a level of experience of the reviewer, at least one review node being a machine review node and at least one node being a human review node;

determining a range of excluded but relevant documents for both a batch of machine reviewed documents and a batch of human reviewed documents;

comparing the ranges together to determine a difference between machine reviewed documents and human reviewed documents; and utilizing machine document review if the difference is less than a threshold amount.

12. The method according to claim 11, further comprising predicting a cost of a document review as a function of at least one of a margin of error and a confidence level.

13. The method according to claim 11, further comprising:

determining a percentage of documents missed in a document review; and determining a level of risk based on the percentage.

14. The method according to claim 11, further comprising predicting a number of relevant documents in a further subset of documents representing the total amount of documents excluding the randomly selected subset of documents.

* * * * *

UNITED STATES PATENT AND TRADEMARK OFFICE
CERTIFICATE OF CORRECTION

PATENT NO. : 9,785,634 B2
APPLICATION NO. : 13/153419
DATED : October 10, 2017
INVENTOR(S) : Jan Puzicha It is certified that error appears in the above-identified patent and that said Letters Patent is hereby corrected as shown below:

Column 9, Line 35 delete "4. The method according to claim 1, wherein:" and ending with "area and a level of experience of the reviewer." in Column 9, Line 43, and insert the following claim: --4. The method according to claim 1, wherein: the random grouping of the randomly selected subset of documents into the plurality of batches is based on at least one of type of document, names mentioned in the documents, and key words; and the assigning of each of the randomly grouped batches to a review node of the plurality of review nodes is based on at least one of an expertise of a reviewer in a certain area and a level of experience of the reviewer.--

Signed and Sealed this
Thirteenth Day of March, 2018

Andrei Iancu
*Director of the United States Patent and Trademark Office*